United States Patent
Nakagomi et al.

(10) Patent No.: US 9,439,274 B2
(45) Date of Patent: Sep. 6, 2016

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Yoichi Nakagomi, Matsumoto (JP); Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/795,386

(22) Filed: Jul. 9, 2015

(65) Prior Publication Data

US 2016/0066399 A1 Mar. 3, 2016

(30) Foreign Application Priority Data

Sep. 1, 2014 (JP) .................................. 2014-176876

(51) Int. Cl.
*H05B 37/02* (2006.01)
*H05B 41/392* (2006.01)
*H04N 9/31* (2006.01)

(52) U.S. Cl.
CPC .......... *H05B 41/3927* (2013.01); *H04N 9/312* (2013.01); *H04N 9/3197* (2013.01); *Y02B 20/204* (2013.01)

(58) Field of Classification Search
CPC .......... H05B 41/2928; H05B 41/3928; H05B 41/2925; H05B 41/38; H05B 37/02; H05B 33/0815; H05B 33/0818; H05B 33/0836; H05B 39/04; H05B 41/2828; H05B 41/36; H05B 41/3921; H05B 41/3927; G03B 21/2026; G03B 21/2053; G03B 21/005; G03B 21/00; H04N 9/312; H04N 9/3197
See application file for complete search history.

(56) References Cited

U.S. PATENT DOCUMENTS

| | | | | |
|---|---|---|---|---|
| 7,956,315 B2* | 6/2011 | Yamauchi | ............... | G03B 21/00 250/205 |
| 8,008,869 B2* | 8/2011 | Soma | ................. | H05B 41/2928 315/209 R |
| 8,120,282 B2* | 2/2012 | Yamauchi | .......... | H05B 41/2928 315/247 |
| 8,174,199 B2* | 5/2012 | Soma | ................. | H05B 41/2886 315/209 R |
| 8,269,424 B2* | 9/2012 | Terashima | ......... | H05B 41/2883 315/246 |
| 8,378,581 B2* | 2/2013 | Terashima | ......... | H05B 41/2928 315/246 |
| 8,400,068 B2* | 3/2013 | Terashima | ......... | H05B 41/2883 315/246 |
| 8,773,036 B2* | 7/2014 | Terashima | ......... | G03B 21/2026 315/287 |
| 8,853,961 B2* | 10/2014 | Terashima | ......... | H05B 41/2928 315/246 |
| 8,988,006 B2* | 3/2015 | Terashima | ......... | G03B 21/2026 315/246 |

(Continued)

FOREIGN PATENT DOCUMENTS

| | | |
|---|---|---|
| JP | 2003-131324 A | 5/2003 |
| JP | 2004-134162 A | 4/2004 |

(Continued)

*Primary Examiner* — Vibol Tan
(74) *Attorney, Agent, or Firm* — Oliff PLC

(57) ABSTRACT

A discharge lamp driving device according to an aspect includes: a discharge lamp driving section configured to supply driving power to a discharge lamp including electrodes and a control section configured to control the discharge lamp driving section. The control section is configured to perform a steady lighting driving for supplying first driving power to the discharge lamp and a high power driving for supplying second driving power larger than the first driving power to the discharge lamp. The magnitude of heat load on the electrodes by the high power driving changes on the basis of the first driving power.

17 Claims, 8 Drawing Sheets

(56) References Cited

U.S. PATENT DOCUMENTS

| | | |
|---|---|---|
| 2004/0075392 A1 | 4/2004 | Arimoto et al. |
| 2004/0245622 A1 | 12/2004 | Shimanuki et al. |
| 2005/0067979 A1 | 3/2005 | Haruna et al. |
| 2005/0189885 A1 | 9/2005 | Haruna et al. |
| 2006/0028153 A1 | 2/2006 | Haruna et al. |
| 2006/0097665 A1 | 5/2006 | Haruna et al. |
| 2007/0262729 A1 | 11/2007 | Sugaya et al. |
| 2012/0154757 A1* | 6/2012 | Terashima ......... G03B 21/2026 353/30 |
| 2013/0271736 A1 | 10/2013 | Terashima et al. |
| 2015/0103323 A1* | 4/2015 | Nakagomi ........... H04N 9/3155 353/85 |

FOREIGN PATENT DOCUMENTS

| | | |
|---|---|---|
| JP | 2005-108473 A | 4/2005 |
| JP | 2005-243381 A | 9/2005 |
| JP | 2008-041588 A | 2/2008 |
| JP | 2008-270058 A | 11/2008 |
| JP | 4400125 B2 | 1/2010 |
| JP | 4972992 B2 | 7/2012 |
| JP | 2012-145712 A | 8/2012 |

\* cited by examiner

Ws = 160(W)

Ws = 140(W)

Ws = 120(W)

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

In recent years, energy saving for projectors has been demanded. Therefore, there has been proposed a projector implemented with various lighting modes such as a low power mode for reducing driving power to a lamp to be lower than usual, a dimming mode for changing the driving power in synchronization with an image signal, and a standby mode for reducing the driving power when a video signal is not input from the outside. For example, in the low power mode, since the driving power supplied to the lamp is low, a load on electrodes decreases and the life of the lamp is increased.

However, when the driving power is smaller than rated power, protrusions at electrode distal ends cannot be sufficiently melted. When lighting is continued for a long time, the protrusions are worn and reduced. The reduction of the protrusions leads to an increase in an inter-electrode distance and causes deterioration in illuminance. That is, when the shape of the protrusions at the electrode distal ends cannot be maintained, the advantage of the low power mode cannot be utilized and the life of the lamp decreases. Therefore, in order to solve this problem, for example, as disclosed in JP-A-2008-270058 (Patent Literature 1), there has been proposed a discharge lamp lighting device and a projector that drive a lamp in a refresh lighting mode for facilitating melting of protrusions of electrodes in a predetermined period after lamp lighting.

In a lighting mode with relatively low driving power, since heat load applied to electrodes is small, protrusions at electrode distal ends are thinned. Therefore, when, under conditions same as conditions for a lamp on which a mode with relatively high driving power is executed, the refresh lighting mode is executed on a lamp (a discharge lamp) on which the lighting mode with the relatively low driving power is executed, the heat load is excessively applied to the thinned protrusions. Consequently, the protrusions disappear and flickering of the discharge lamp sometimes occurs.

SUMMARY

An advantage of some aspects of the invention is to provide a discharge lamp driving device that can suppress occurrence of flickering of a discharge lamp, a light source device including the discharge lamp driving device, and a projector including the light source device. An advantage of some aspects of the invention is to provide a discharge lamp driving method that can suppress occurrence of flickering of a discharge lamp.

A discharge lamp driving device according to an aspect of the invention includes: a discharge lamp driving section configured to supply driving power to a discharge lamp including electrodes; and a control section configured to control the discharge lamp driving section. The control section is configured to perform a steady lighting driving for supplying first driving power to the discharge lamp and a high power driving for supplying second driving power larger than the first driving power to the discharge lamp. The magnitude of heat load on the electrodes by the high power driving changes on the basis of the first driving power.

According to the aspect of the invention, since the magnitude of the heat load on the electrodes by the high power driving is set on the basis of the first driving power, when the first driving power is relatively low and protrusions at electrode distal ends are thinned, it is possible to set the magnitude of the heat load on the electrodes by the high power driving to be small. Therefore, according to the aspect of the invention, it is possible to suppress the protrusions from disappearing and suppress flickering of the discharge lamp from occurring.

The magnitude of the heat load may be set to be smaller as the first driving power is smaller.

With this configuration, the heat load can be set smaller as the protrusions of the electrodes are thinner. Therefore, it is possible to suppress flickering of the discharge lamp from occurring.

The magnitude of the heat load changes on the basis of the first driving power in previous steady lighting driving.

With this configuration, it is possible to appropriately execute high power driving according to a state of the protrusions of the electrodes.

The magnitude of the heat load may be adjusted according to a value of the second driving power in the high power driving.

With this configuration, it is possible to adjust the magnitude of the heat load according to the value of the second driving power.

The magnitude of the heat load may be adjusted according to a waveform of a driving current supplied to the discharge lamp in the high power driving.

With this configuration, it is possible to adjust the magnitude of the heat load according to the waveform of the driving current.

The control section may control the discharge lamp driving section to perform the high power driving in a launching period from a start of lighting of the discharge lamp to a shift to a steady lighting period when the steady lighting driving is performed.

With this configuration, it is possible to suppress the discharge lamp from flickering when the high power driving is performed.

The control section may control the discharge lamp driving section to perform the high power driving in a steady lighting period when the steady lighting driving is performed.

With this configuration, it is possible to execute the high power driving at appropriate timing.

A light source device according to another aspect of the invention includes: the discharge lamp configured to emit light; and the discharge lamp driving device.

According to the aspect of the invention, since the light source device includes the discharge lamp driving device, it is possible to obtain the light source device that can suppress flickering of the discharge lamp from occurring.

A projector according to still another aspect of the invention includes: the light source device; a light modulating device configured to modulate, according to a video signal, light emitted from the light source device; and a projection optical system configured to project the light modulated by the light modulating device.

According to the aspect of the invention, since the projector includes the light source device, it is possible to obtain the projector that can suppress flickering of the discharge lamp from occurring.

A discharge lamp driving method according to yet another aspect of the invention is a discharge lamp driving method for supplying driving power to a discharge lamp including electrodes and driving the discharge lamp. The discharge lamp driving method includes: performing a steady lighting driving for supplying first driving power to the discharge lamp; and performing a high power driving for supplying second driving power larger than the first driving power to the discharge lamp. The magnitude of heat load on the electrodes by the high power driving changes on the basis of the first driving power.

According to the aspect of the invention, it is possible to suppress flickering of the discharge lamp from occurring in the same manner as explained above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
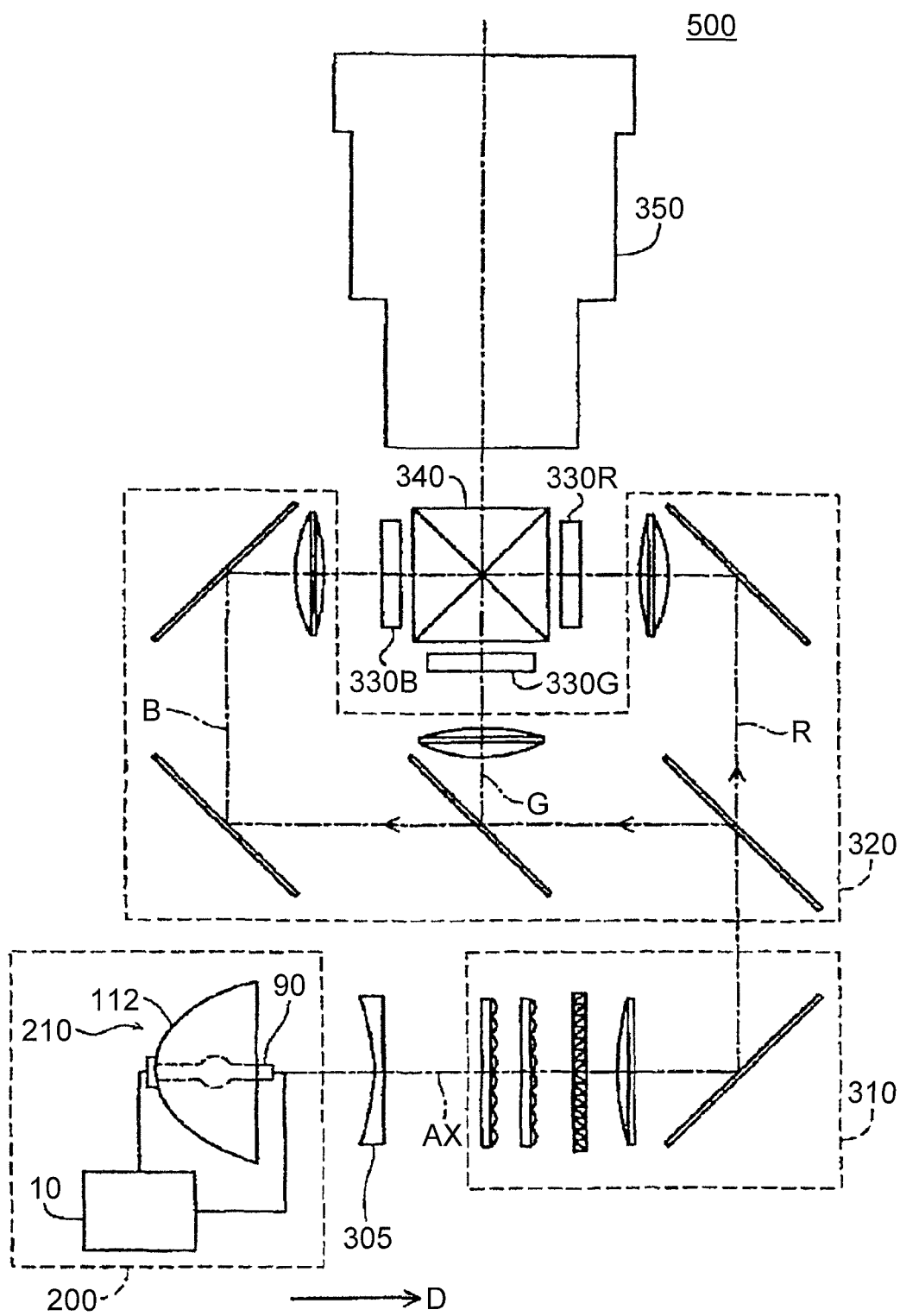
FIG. 1 is a schematic configuration diagram of a projector in an embodiment.

A projector according to an embodiment of the invention is explained below with reference to the drawings.

Note that the scope of the invention is not limited to the embodiment explained below and can be optionally changed within the technical idea of the invention. In the drawings referred to below, scales, numbers, and the like in structures shown in the drawings are sometimes different from those in actual structures to clearly show components.

As shown in FIG. 1, a projector 500 in this embodiment includes a light source device 200, a collimating lens 305, an illumination optical system 310, a color-separation optical system 320, three liquid crystal light valves 330R, 330G, and 330B (light modulating devices), a cross dichroic prism 340, and a projection optical system 350.

Light emitted from the light source device 200 passes through the collimating lens 305 and is made incident on the illumination optical system 310. The collimating lens 305 collimates the light emitted from the light source device 200.

The illumination optical system 310 adjusts the illuminance of the light emitted from the light source device 200 to be equalized on the liquid crystal light valves 330R, 330G, and 330B. Further, the illumination optical system 310 aligns polarizing directions of the light emitted from the light source device 200 in one direction. This is for the purpose of effectively using the light emitted from the light source device 200 in the liquid crystal light valves 330R, 330G, and 330B.

The light, the illuminance distribution and the polarizing directions of which are adjusted, is made incident on the color-separation optical system 320. The color-separation optical system 320 separates the incident light into three color lights of red light (R), green light (G), and blue light (B). The three color lights are respectively modulated, according to a video signal, by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure). The polarizing plates are respectively disposed on light incident sides and light emission sides of the liquid crystal panels 560R, 560G, and 560B.

The modulated three color lights are combined by the cross dichroic prism 340. The combined light is made incident on the projection optical system 350. The projection optical system 350 projects the incident light on a screen 700 (see FIG. 3). Consequently, a video is displayed on the screen 700. Note that, as the respective configurations of the collimating lens 305, the illumination optical system 310, the color-separation optical system 320, the cross dichroic prism 340, and the projection optical system 350, well-known configurations can be adopted.

Figure 2:
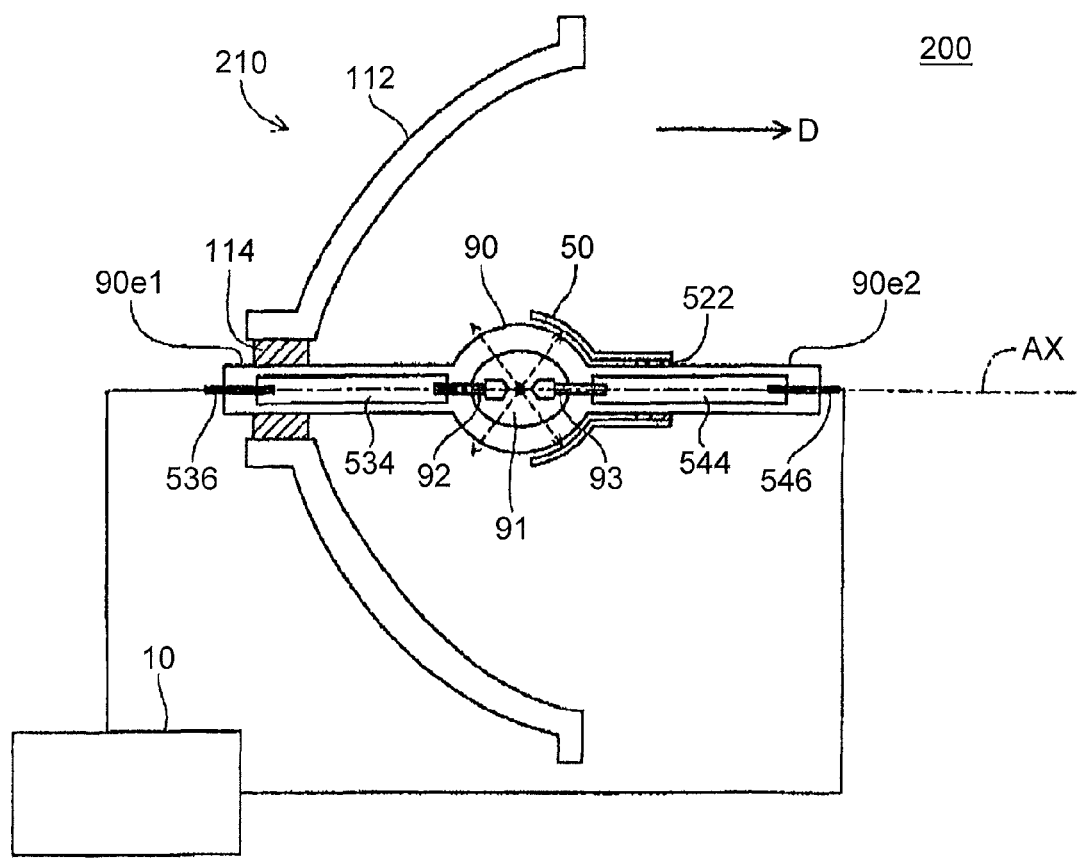
FIG. 2 is a sectional view of a discharge lamp in the embodiment.

FIG. 2 is a sectional view showing the configuration of the light source device 200. The light source device 200 includes a light source unit 210, a discharge lamp lighting device (a discharge lamp driving device) 10. In FIG. 2, a sectional view of the light source unit 210 is shown. The light source unit 210 includes a main reflection mirror 112, a discharge lamp 90, and a secondary reflection mirror 50.

The discharge lamp lighting device 10 supplies driving power Wd (a driving current I) to the discharge lamp 90 and lights the discharge lamp 90. The main reflection mirror 112 reflects light emitted from the discharge lamp 90 to an irradiating direction D. The irradiating direction D is parallel to an optical axis AX of the discharge lamp 90.

The shape of the discharge lamp 90 is a bar shape extending along the irradiating direction D. One end portion of the discharge lamp 90 is represented as first end portion 90e1 and the other end portion of the discharge lamp 90 is represented as second end portion 90e2. The material of the discharge lamp 90 is, for example, a translucent material such as quartz glass. The center of the discharge lamp 90 is swelled in a spherical shape. The inside of the discharge lamp 90 is a discharge space 91. In the discharge space 91, gas, which is a discharge medium, including rare gas and metal halide is encapsulated.

The distal ends of a first electrode (an electrode) 92 and a second electrode (an electrode) 93 project to the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 is a bar shape extending along the optical axis AX. In the discharge space 91, the electrode distal end portions of the first electrode 92 and the second electrode 93 are disposed to be opposed a predetermined distance apart from each other. The material of the first electrode 92 and the second electrode 93 is, for example, metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is, for example, metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies driving power Wd for driving the discharge lamp 90 to the first terminal 536 and the second terminal 546. As a result, arc discharge occurs between the first electrode 92 and the second electrode 93. Light (discharge light) generated by the arc discharge is radiated to all directions from a discharge position as indicated by broken line arrows.

The main reflection mirror 112 is fixed to the first end portion 90e1 of the discharge lamp 90 by a fixing member 114. The main reflection mirror 112 reflects, to the irradiating direction D, light traveling toward the opposite side of the irradiating direction D in the discharge light. The shape of a reflection surface (a surface on the discharge lamp 90 side) of the main reflection mirror 112 is not particularly limited as long as the reflection surface can reflect the discharge light to the irradiating direction D. For example, the shape may be a spheroid shape or a paraboloid shape. For example, when the shape of the reflection surface of the main reflection mirror 112 is formed in the spheroid shape, the main reflection mirror 112 can convert the discharge light into light substantially parallel to the optical axis AX. Consequently, the collimating lens 305 can be omitted.

The secondary reflection mirror 50 is fixed to the second end portion 90e2 side of the discharge lamp 90 by a fixing member 522. The shape of a reflection surface (a surface on the discharge lamp 90 side) of the secondary reflection mirror 50 is a spherical surface shape that surrounds a portion on the second end portion 90e2 side of the discharge space 91. The secondary reflection mirror 50 reflects, to the main reflection mirror 112, light traveling toward the opposite side of the disposed side of the main reflection mirror 112 in the discharge light. Consequently, it is possible to improve efficiency of use of the light radiated from the discharge space 91.

The material of the fixing members 114 and 522 is not particularly limited as long as the material is a heat resistant material that can withstand heat generation from the discharge lamp 90. The material is, for example, an inorganic adhesive. A method of fixing the disposition of the main reflection mirror 112, the secondary reflection mirror 50, and the discharge lamp 90 is not limited to a method of fixing the main reflection mirror 112 and the secondary reflection mirror 50 to the discharge lamp 90. Any method can be adopted. For example, the discharge lamp 90 and the main reflection mirror 112 may be independently fixed to a housing (not shown in the figure) of the projector 500. The same applies to the secondary reflection mirror 50.

The circuit configuration of the projector 500 is explained.

Figure 3:
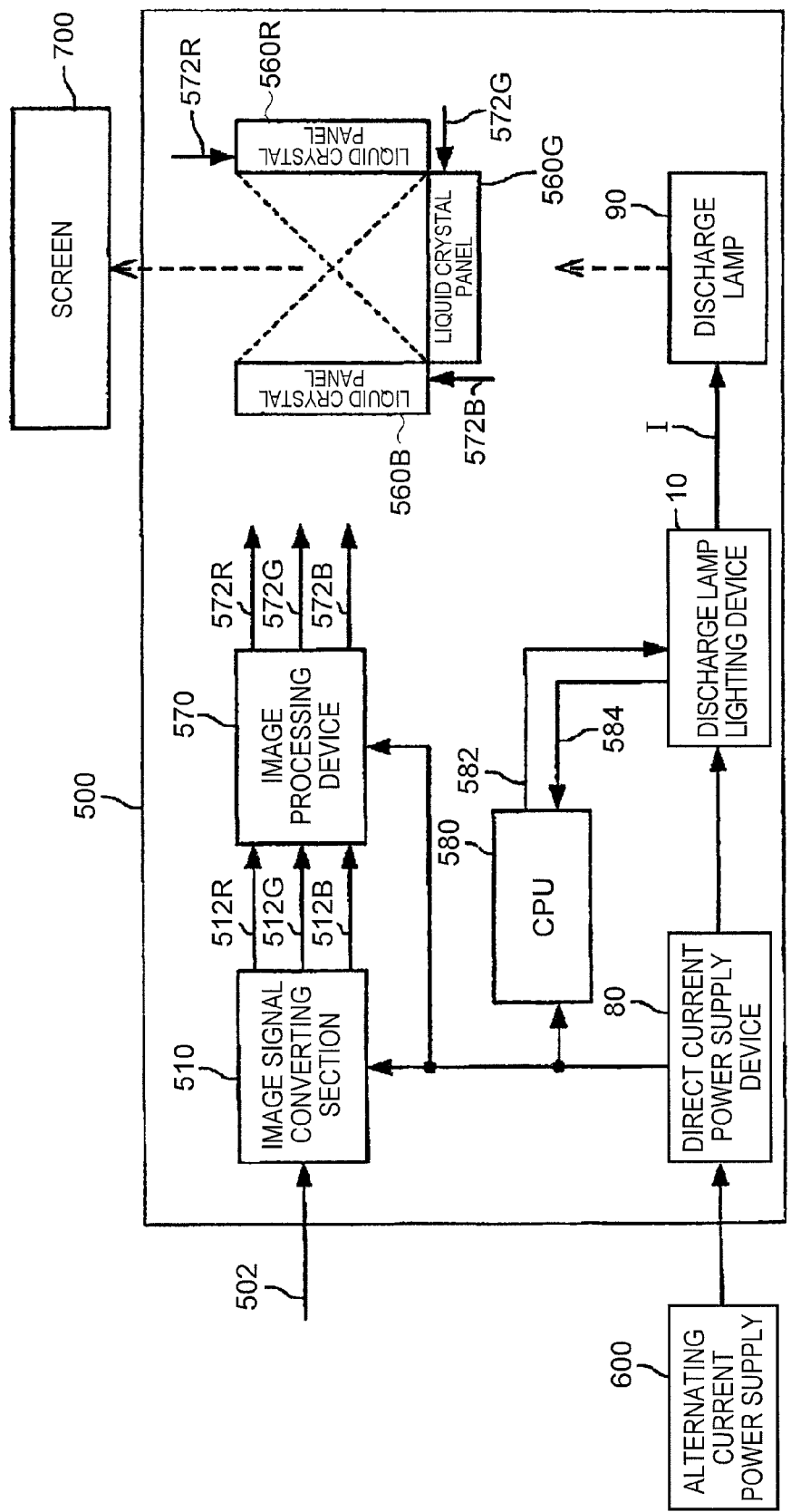
FIG. 3 is a block diagram showing various components of the projector in the embodiment.

FIG. 3 is a diagram showing an example of the circuit configuration of the projector 500 in this embodiment. The projector 500 includes, besides the optical systems shown in FIG. 1, an image signal converting section 510, a direct current power supply device 80, the liquid crystal panels 560R, 560G, and 560B, an image processing device 570, and a CPU (Central Processing Unit) 580.

The image signal converting section 510 converts an image signal 502 (a luminance-color difference signal, an analog RGB signal, etc.) input from the outside into a digital RGB signal having a predetermined word length, generates image signals 512R, 512G, and 512B, and supplies the image signals 512R, 512G, and 512B to the image processing device 570.

The image processing device 570 applies image processing to each of the three image signals 512R, 512G, and 512B. The image processing device 570 supplies driving signals 572R, 572G, and 572B for respectively driving the liquid crystal panels 560R, 560G, and 5603 to the liquid crystal panels 560R, 560G, and 560B.

The direct current power supply device 80 converts an alternating current voltage supplied from an external alternating current power supply 600 into a fixed direct current voltage. The direct current power supply device 80 supplies the direct current voltage to the image signal converting section 510 and the image processing device 570 present on a secondary side of a transformer (although not shown in the figure, included in the direct current power supply device 80) and the discharge lamp lighting device 10 present on a primary side of the transformer.

The discharge lamp lighting device 10 generates a high voltage between the electrodes of the discharge lamp 90 during a start, causes dielectric breakdown, and forms a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B. The liquid crystal panels 560R, 560G, and 560B modulate, respectively on the basis of the driving signals 572R, 572G, and 572B, transmittances (luminances) of the color lights made incident on the liquid crystal panels 560R, 560G, and 560B via the optical systems.

The CPU 580 controls various operations from a lighting start to extinction of the projector 500. For example, in the example shown in FIG. 3, the CPU 580 outputs a lighting command and an extinction command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
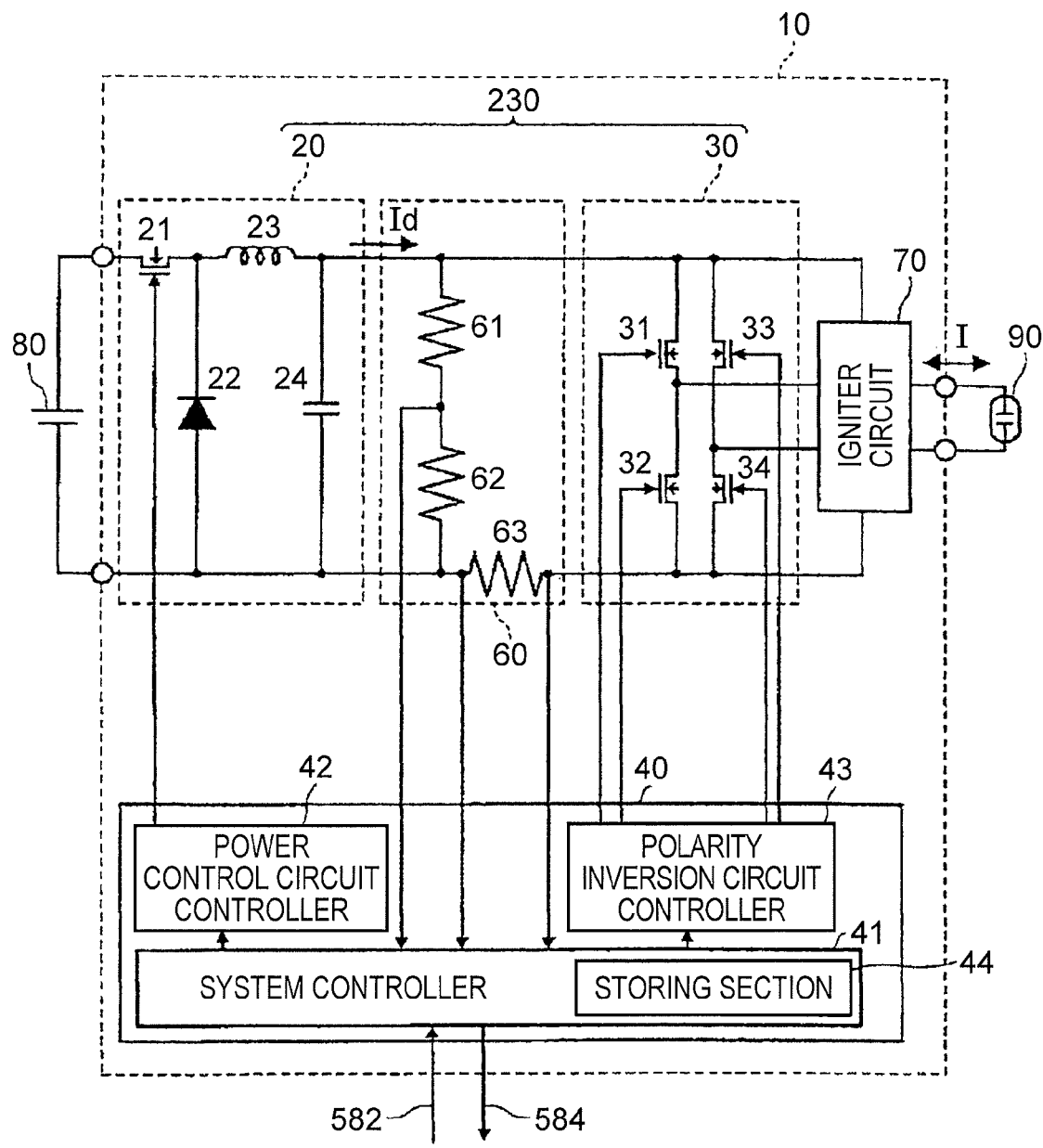
FIG. 4 is a circuit diagram of a discharge lamp lighting device in the embodiment.

FIG. 4 is a diagram showing an example of the circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power Wd supplied to the discharge lamp 90. In this embodiment, the power control circuit 20 is configured by a down-chopper circuit that receives a voltage from the direct current power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the direct current power supply device 80 and the other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the direct current power supply device 80. A current control signal is input to a control terminal of the switch element 21 from the control section 40 explained below. ON/OFF of the switch element 21 is controlled. As the current control signal, for example, a PWM (Pulse Width Modulation) control signal may be used.

When the switch element 21 is turned on, electric current flows to the coil 23 and energy is accumulated in the coil 23. Thereafter, when the switch element 21 is turned off, the energy accumulated in the coil 23 is discharged through a route that passes the capacitor 24 and the diode 22. As a result, the direct current Id corresponding to a ratio of time in which the switch element 21 is ON is generated.

The polarity inversion circuit 30 inverts, at predetermined timing, the polarities of the direct current Id input from the power control circuit 20. Consequently, the polarity inversion circuit 30 generates the driving current I, which is a direct current continuing for a controlled time, or the driving current I, which is an alternating current having any frequency, and outputs the driving current I. In this embodiment, the polarity inversion circuit 30 is configured by an inverter bridge circuit (a full-bridge circuit).

The polarity inversion circuit 30 includes, for example, a first switch element 31, a second switch element 32, a third switch element 33, and a fourth switch element 34 configured by a transistor or the like. The polarity inversion circuit 30 includes a configuration in which the first switch element 31 and the second switch element 32 connected in series and the third switch element 33 and the fourth switch element 34 connected in series are connected to each other in parallel. Polarity inversion control signals are respectively input to the first switch element 31, the second switch element 32, the third switch element 33, and the fourth switch element 34 from the control section 40. ON/OFF operations of the first switch element 31, the second switch element 32, the third switch element 33, and the fourth switch element 34 are controlled on the basis of the polarity inversion control signals.

In the polarity inversion circuit 30, operation for alternating turning on and off the first and fourth switch elements 31 and 34 and the second and third switch elements 32 and 33 is repeated. Consequently, the polarities of the direct current Id output from the power control circuit 20 are alternately inverted. The polarity inversion circuit 30 generates the driving current I, which is a direct current for continuing the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are ON, the second switch element 32 and the third switch element 33 are OFF and, when the first switch element 31 and the fourth switch element 34 are OFF, the second switch element 32 and the third switch element 33 are ON. Therefore, when the first switch element 31 and the fourth switch element 34 are ON, the driving current I flowing from one end of the capacitor 24 to the first switch element 31, the discharge lamp 90, and the fourth switch element 34 in this order is generated. When the second switch element 32 and the third switch element 33 are ON, the driving current I flowing from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving power Wd (the driving current I) for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues the same polarity, a current value of the driving current I (a power value of the driving power Wd), and a frequency. The control section 40 applies, to the polarity inversion circuit 30, at polarity inversion timing of the driving current I, polarity inversion control for controlling the retention time in which the driving current I continues at the same polarity, the frequency of the driving current I, and the like. The control section 40 applies, to the power control circuit 20, current control for controlling a current value of the output direct current Id.

In this embodiment, the control section 40 performs a steady lighting mode (steady lighting driving) in which steady lighting power (first driving power) Ws is supplied to the discharge lamp 90 and a high power mode (high power driving) in which refresh power (second driving power) Wr larger than the steady lighting power Ws is supplied to the discharge lamp 90.

In this embodiment, the control section 40 sets, on the basis of the steady lighting power Ws, the magnitude of heat load on the first electrode 92 and the second electrode 93 by the high power mode. That is, the magnitude of the heat load on the first electrode 92 and the second electrode 93 is set on the basis of the steady lighting power Ws. Details are explained below.

The configuration of the control section 40 is not particularly limited. In this embodiment, the control section 40 includes a system controller 41, a power control circuit controller 42, and a polarity inversion circuit controller 43. Note that a part of or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage V1a and the driving current I detected by the operation detecting section 60.

In this embodiment, a storing section 44 is connected to the system controller 41.

The system controller 41 may control the power control circuit 20 and the polarity inversion circuit 30 on the basis of information stored in the storing section 44. In the storing section 44, for example, information concerning driving parameters such as the retention time in which the driving current I continues at the same polarity and a current value, a frequency, a waveform, and a modulation pattern of the driving current I may be stored.

In this embodiment, in the storing section 44, a value of the steady lighting power Ws supplied to the discharge lamp 90 in a lighting mode executed previous time and a value of the refresh power Wr set for each steady lighting power Ws are stored.

Note that, in this specification, the lighting mode executed previous time includes a lighting mode executed immediately before a power supply is disconnected last time.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 can be realized using a dedicated circuit to perform the control explained above and various kinds of control of processing explained below. On the other hand, for example, a CPU executes a control program stored in the storing section 44, whereby the control section 40 can function as a computer and perform various kinds of control of these kinds of processing.

Figure 5:
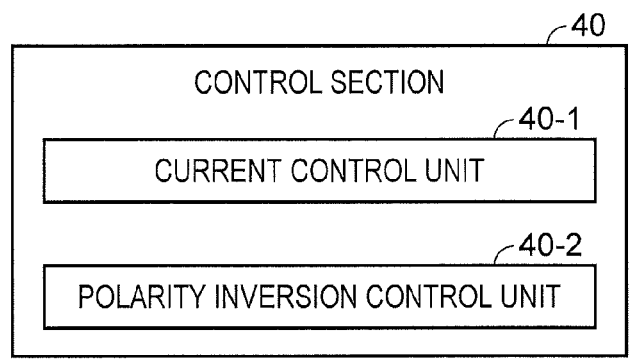
FIG. 5 is a block diagram showing a configuration example of a control section in the embodiment.

FIG. 5 is a diagram for explaining another configuration example of the control section 40. As shown in FIG. 5, the control section 40 may be configured to function as, according to a control program, a current control unit 40-1 configured to control the power control circuit 20 and a polarity inversion control unit 40-2 configured to control the polarity inversion circuit 30.

In the example shown in FIG. 4, the control section 40 is configured as a part of the discharge lamp lighting device 10. On the other hand, the CPU 580 may be configured to perform a part of the functions of the control section 40.

In this embodiment, the operation detecting section 60 includes a voltage detecting section that detects the lamp voltage V1*a* of the discharge lamp 90 and outputs lamp voltage information to the control section 40. The operation detecting section 60 may include, for example, a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage V1*a* with a voltage divided by the first resistor 61 and the second resistor 62 connected in series to each other in parallel to the discharge lamp 90. In this embodiment, the current detecting section detects the driving current I with a voltage generated in the third resistor 63 connected in series to the discharge lamp 90.

The igniter circuit 70 operates only during a lighting start of the discharge lamp 90. The igniter circuit 70 supplies, to an interelectrode space (between the first electrode 92 and the second electrode 93) of the discharge lamp 90, a high voltage (a voltage higher than a voltage during normal lighting of the discharge lamp 90) necessary for causing dielectric breakdown in the interelectrode space (between the first electrode 92 and the second electrode 93) of the discharge lamp 90 during the lighting start of the discharge lamp 90 and forming a discharge path. In this embodiment, the igniter circuit 70 is connected in parallel to the discharge lamp 90.

Figures 6A, 6B:
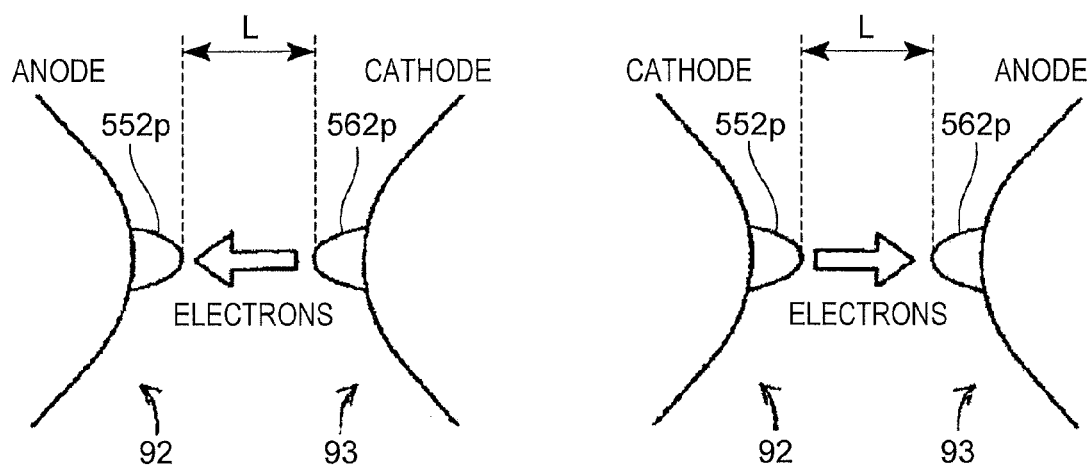
FIGS. 6A and 6B are diagrams showing states of protrusions at electrode distal ends of the discharge lamp.

In FIGS. 6A and 6B, the distal end portions of the first electrode 92 and the second electrode 93 are shown. Protrusions 552*p* and 562*p* are respectively formed at the distal ends of the first electrode 92 and the second electrode 93. Electric discharge that occurs between the first electrode 92 and the second electrode 93 mainly occurs between the protrusion 552*p* and the protrusion 562*p*. When the protrusions 552*p* and 562*p* are present as in this embodiment, compared with when protrusions are absent, it is possible to suppress movement of discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision and the temperature of the distal end (the protrusion 552*p*) of the anode (the first electrode 92) rises.

FIG. 6B shows a second polarity state in which the first electrode 92 operates as a cathode and the second electrode 93 operates as an anode. In the second polarity state, contrary to the first polarity state, electrons move from the first electrode 92 to the second electrode 93. As a result, the temperature of the distal end (the protrusion 562*p*) of the second electrode 93 rises.

In this way, since the driving current I is supplied to the discharge lamp 90, the temperature of the anode, with which the electrons collide, rises. On the other hand, the temperature of the cathode, which emits the electrons, drops while the cathode is emitting the electrons to the anode.

An interelectrode distance L between the first electrode 92 and the second electrode 93 increases according to deterioration of the protrusions 552*p* and 562*p*. This is because the protrusions 552*p* and 562*p* wear. When the interelectrode distance L increases, since the resistance between the first electrode 92 and the second electrode 93 increases, the lamp voltage V1*a* increases. Therefore, it is possible to detect a change in the interelectrode distance L, that is, a deterioration degree of the discharge lamp 90 by referring to the lamp voltage V1*a*.

Note that the first electrode 92 and the second electrode 93 have the same configuration. Therefore, in the following explanation, only the first electrode 92 is sometimes representatively explained. The protrusion 552*p* at the distal end of the first electrode 92 and the protrusion 562*p* at the distal end of the second electrode 93 have the same configuration. Therefore, in the following explanation, only the protrusion 552*p* is sometimes representatively explained.

Control of the driving power Wd supplied to the discharge lamp 90 in this embodiment is explained.

In the following explanation, as an example, the high power mode is executed in the launching period from the start of the lighting of the discharge lamp 90 to the shift to the steady lighting mode.

In the following explanation, as an example, the magnitude of heat load on the first electrode 92 in the high power mode is adjusted according to the value of the refresh power Wr. That is, in this embodiment, the magnitude of the heat load on the first electrode 92 in the high power mode is increased by increasing the value of the refresh power Wr. The heat load on the first electrode 92 in the high power mode is reduced by reducing the value of the refresh power Wr.

Figure 7:
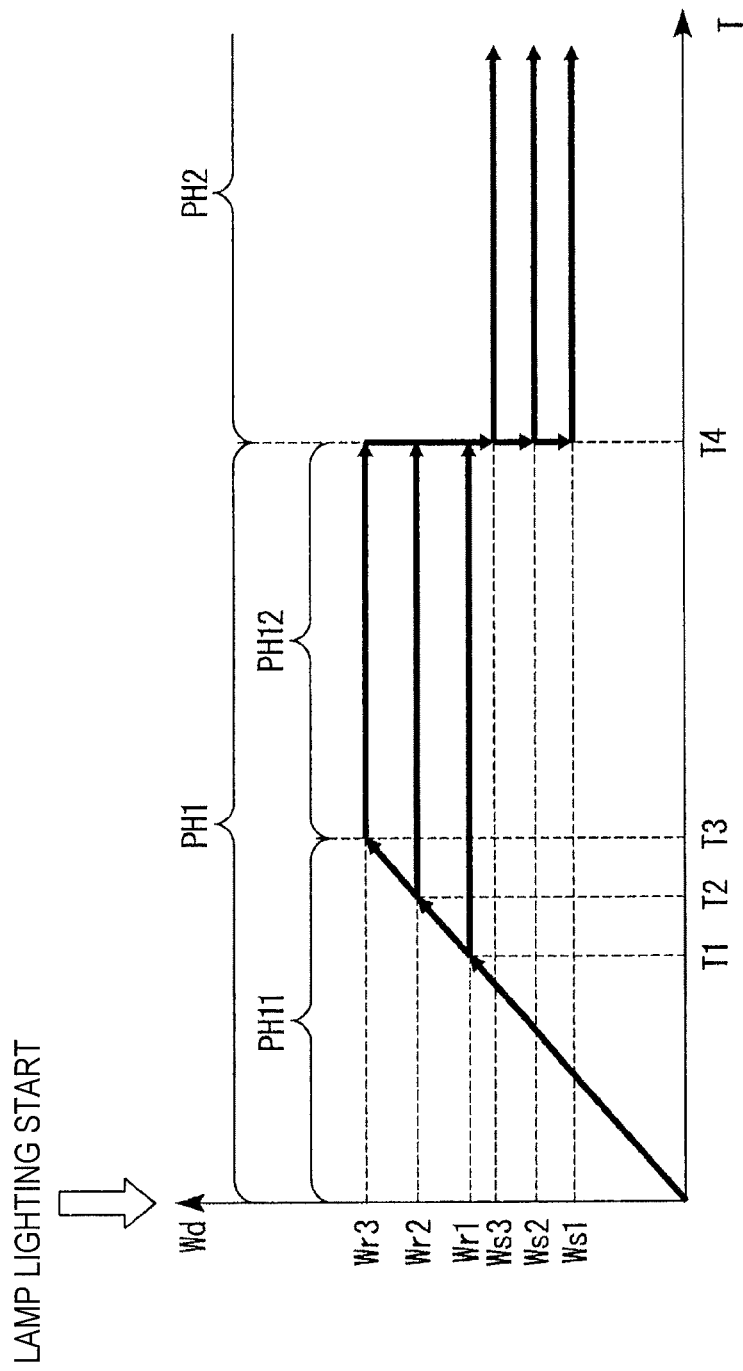
FIG. 7 is a diagram showing an example of a driving power waveform in the embodiment.

FIG. 7 is a diagram showing a driving power waveform in this embodiment. In FIG. 7, the ordinate indicates the driving power Wd and the abscissa indicates time T. In FIG. 7, a change in the driving power Wd from the start of the lighting of the discharge lamp 90 to a state in which the discharge lamp 90 is driven by the steady lighting mode is shown. In FIG. 7, driving power waveforms in respective cases in which the steady lighting power Ws is Ws1, Ws2, and Ws3 are shown. The steady lighting power Ws3, the steady lighting power Ws2, and the steady lighting power Ws1 become smaller in this order.

As shown in FIG. 7, when the lighting of the discharge lamp 90 is started (a lamp lighting start), after gradually rising, the driving power Wd reaches predetermined target power (the refresh power Wr). At this point, the plasma density in the inside of the discharge lamp 90 is small, the temperature in the inside is low, and the driving power Wd is in an unstable state. Thereafter, as the plasma density in the inside of the discharge lamp 90 increases and the temperature in the inside rises, the driving power Wd changes to a stable state. A period from the lighting start of the discharge lamp 90 to the stabilization of the driving power Wd is defined as a launching period PH1. In a period after the launching period PH1, the discharge lamp 90 is lit. This period is defined as a steady lighting period PH2.

In the driving power waveform in this embodiment, the launching period PH1 includes a first launching period when the driving power Wd gradually increases to the refresh power Wr, for example, a first launching period PH11, and a second launching period when the driving power Wd is maintained to be fixed at the value of the refresh power Wr, for example, a second launching period PH12. The second launching period is a high power lighting period when the discharge lamp 90 is driven in the high power mode.

The steady lighting period PH2 is a period when the steady lighting mode in which the steady lighting power Ws is supplied to the discharge lamp 90 is executed. The steady lighting power Ws is smaller than the refresh power Wr in the second launching period.

In this embodiment, the magnitude of the refresh power Wr in the high power mode is set on the basis of a value of the steady lighting power Ws in the steady lighting period PH2. Therefore, a driving power waveform of the launching period PH1 is different for each value of the steady lighting power Ws. The first launching period PH11 and a second launching period PH12 shown in FIG. 7 indicate the first launching period and the second launching in the case in which the steady lighting power Ws in the steady lighting period PH2 is Ws3. In the example shown in FIG. 7, in the case in which the steady lighting power Ws is Ws3, the refresh power Wr is set to Wr3.

In the first launching period PH11, the driving power Wd gradually increases to the refresh power Wr3. When the driving power Wd reaches the refresh power Wr3 (time T3), the driving power waveform shifts to the second launching period PH12. In the second launching period PH12, the driving power Wd is maintained to be fixed at a value of the refresh power Wr3. After the second launching period PH12 is executed for a predetermined time, for example, from time T3 to time T4 in the example shown in FIG. 7, the driving power waveform shifts to the steady lighting period PH2.

In the case in which the steady lighting power Ws is Ws2, when the driving power Wd reaches refresh power Wr2 (time T2), the driving power waveform shifts to the second launching period and the driving power Wd is maintained to be fixed at a value of the refresh power Wr2. In this case, the second launching period is equivalent to a period of time T2 to time T4. The driving power waveform shifts to the steady lighting period PH2 after the second launching period.

In the case in which the steady lighting power Ws is Ws1, when the driving power Wd reaches refresh power Wr1 (time T1), the driving power waveform shifts to the second launching period and the driving power Wd is maintained to be fixed at a value of the refresh power Wr1. In this case, the second launching period is equivalent to a period of time T1 to time T4. The driving power waveform shifts to the steady lighting period PH2 after the second launching period.

In this embodiment, the control section 40 sets the value of the refresh power Wr such that the heat load applied to the first electrode 92 in the high power mode is smaller as the steady lighting power Ws is smaller. That is, in this embodiment, the refresh power Wr is set smaller as the steady lighting power Ws is smaller. Therefore, the refresh power Wr3 in the case of the steady lighting power Ws3, the refresh power Wr2 in the case of the steady lighting power Ws2, and the refresh power Wr1 in the case of the steady lighting power Ws1 become smaller in this order.

An example of the refresh power Wr (W) set with respect to the steady lighting power Ws is shown in Table 1.

TABLE 1

| Steady lighting power Ws (W) | Refresh power Wr (W) |
|---|---|
| 160 | 200 |
| 140 | 185 |
| 120 | 170 |

In Table 1, an example of the refresh powers Wr (W) set when the steady lighting power Ws is 160 W, 140 W, and 120 W is shown.

In this embodiment, the control section 40 determines, on the basis of the steady lighting power Ws in the previous steady lighting mode stored in the storing section 44, the refresh power Wr in the high power mode to be executed and executes the high power mode. As an example, the determination of the refresh power Wr is performed by selecting the refresh power Wr corresponding to the steady lighting power Ws from the refresh power Wr at each steady lighting power Ws stored in the storing section 44 using, for example, a conversion table like Table 1.

As explained above, in the launching period PH1 from the start of the lighting of the discharge lamp 90 to the shift to the steady lighting period PH2 when the steady lighting mode is performed, the control section 40 controls the discharge lamp driving section 230 to execute the high power mode and drives the discharge lamp 90.

The control of the discharge lamp driving section 230 by the control section 40 can also be represented as a discharge lamp driving method. That is, the discharge lamp driving method in this embodiment is a discharge lamp driving method for supplying the driving power Wd to the discharge lamp 90 including the first electrode 92 and the second electrode 93 and driving the discharge lamp 90. The discharge lamp driving method includes a steady lighting mode for supplying the steady lighting power Ws to the discharge lamp 90 and a high power mode for supplying the refresh power Wr larger than the steady lighting power Ws to the discharge lamp 90. The magnitude of heat load on the first electrode 92 and the second electrode 93 by the high power mode is set on the basis of the steady lighting power Ws.

According to this embodiment, the magnitude of the refresh power Wr is set on the basis of the steady lighting power Ws. Therefore, it is possible to suppress flickering of the discharge lamp 90 from occurring. This is explained in detail below.

Figure 8A:
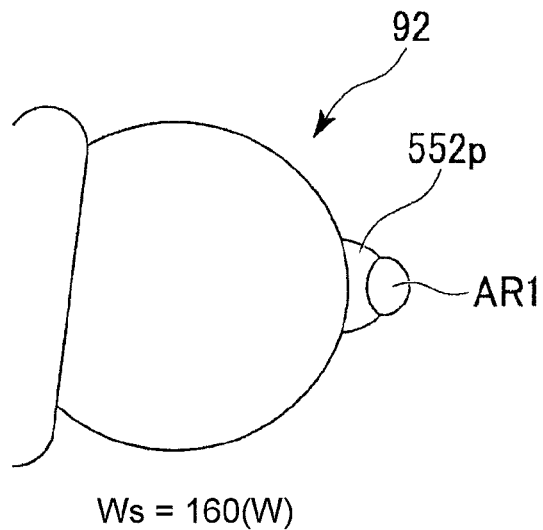
FIGS. 8A to 8C are diagrams showing shapes of the protrusions at the electrode distal ends at each steady lighting power.
Figure 8B:
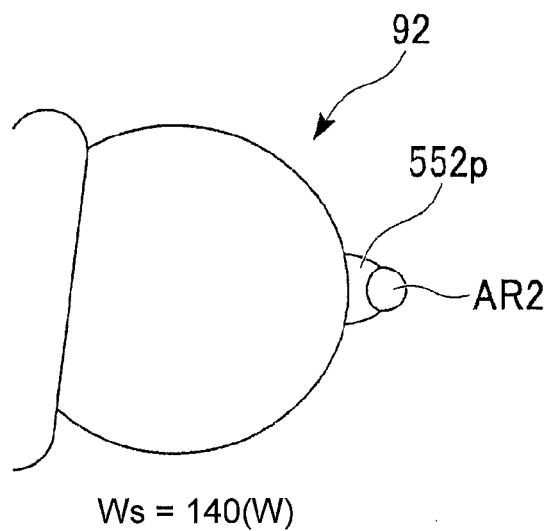
Figure 8C:
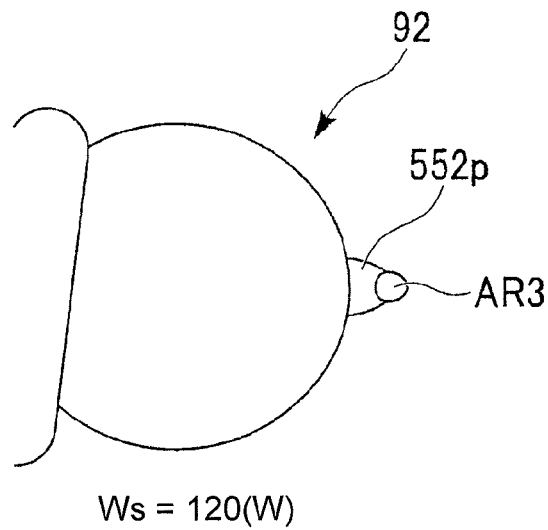

FIGS. 8A to 8C are diagrams showing states of the protrusion 552p of the first electrode 92 in cases in which values of the steady lighting power Ws are different in the respective figures. In FIG. 8A, as an example, the steady lighting power Ws is 160 W. In FIG. 8B, as an example, the steady lighting power Ws is 140 W. In FIG. 8C, as an example, the steady lighting power Ws is 120 W.

As shown in FIGS. 8A to 8C, a value of the driving current I flowing between the electrodes is smaller as the steady lighting power Ws is smaller. Therefore, melting regions AR1, AR2, and AR3 of the electrode are smaller. The thickness of the protrusion 552p of the first electrode 92 corresponds to the sizes of the melting regions AR1 to AR3. Therefore, the protrusion 552p is thinner as the melting regions AR1 to AR3 are smaller. As a result, the protrusion 552p of the first electrode 92 is thinner as the steady lighting power Ws is smaller.

For example, as shown in FIG. 8C, the discharge lamp 90 is driven with the relatively low steady lighting power Ws (120 W), whereby the refresh power Wr (200 W) in the high power mode, which is executed when the protrusion 552p is relatively thick as shown in FIG. 8A, is supplied to the thin protrusion 552p. Then, an excessive heat load is applied to the protrusion 552p and the protrusion 552p sometimes disappears. Consequently, the position of a bright spot of ark discharge in the discharge lamp 90 becomes unstable and flickering sometimes occurs in the discharge lamp 90.

On the other hand, according to this embodiment, the refresh power Wr is set small such that the heat load applied to the first electrode 92 is smaller as the steady lighting power Ws is smaller. Therefore, the high power mode is executed with the relatively low refresh power Wr on the discharge lamp 90 driven with the relatively low steady lighting power Ws. Consequently, heat load is suppressed from being excessively applied to the protrusion 552p thinned by the driving with the relatively low steady lighting power Ws. Therefore, according to this embodiment, it is possible to suppress the protrusion 552p from disappearing and suppress flickering of the discharge lamp 90 from occurring.

According to this embodiment, heat load is properly applied to the protrusion 552p to prevent the protrusion 552p from disappearing. Therefore, it is possible to facilitate the growth of the protrusion 552p according to the steady lighting power Ws while suppressing flickering of the discharge lamp 90 as explained above. Consequently, according to this embodiment, it is possible to improve the life of the discharge lamp 90.

When the disappearance of the protrusion 552p occurs, blackening occurs because a transpired component of the protrusion 552p adheres to the inner wall of a light emitting tube of the discharge lamp 90. The illuminance of the discharge lamp 90 sometimes decreases.

On the other hand, according to this embodiment, since the disappearance of the protrusion 552p can be suppressed, it is possible to suppress the blackening. As a result, it is possible to suppress the illuminance of the discharge lamp 90 from decreasing.

According to this embodiment, the steady lighting power Ws referred to by the control section 40 in setting the refresh power Wr of the high power mode is the steady lighting power Ws supplied to the discharge lamp 90 in the steady lighting mode executed previous time. Therefore, for example, in the first launching period PH11, even when the setting of the steady lighting power Ws is changed, the refresh power Wr of the high power mode is set according to the thickness of the protrusion 552p of the first electrode 92 corresponding to the steady lighting power Ws in the steady lighting mode executed before the setting change of the steady lighting power Ws. Therefore, according to this embodiment, it is possible to appropriately execute the high power mode according to the thickness of the protrusion 552p.

When the high power mode is executed, since the driving power Wd supplied to the discharge lamp 90 increases, the intensity of the light emitted from the discharge lamp 90 increases. Consequently, when the high power mode is executed during the steady lighting period PH2, the intensity of the light emitted from the discharge lamp 90 changes and flickering sometimes occurs.

On the other hand, according to this embodiment, the high power mode is executed in the launching period PH1. Therefore, the driving power Wd is suppressed from increasing in the steady lighting period PH12. It is possible to suppress flickering of the discharge lamp 90 from occurring.

Note that, in this embodiment, configurations and methods explained below can also be adopted.

In the above explanation, the refresh power Wr is set smaller as the steady lighting power Ws is smaller. However, the setting of the refresh power Wr is not limited to this. In this embodiment, when the steady lighting power Ws is equal to or larger than a predetermined value, the refresh power Wr may be fixed and, when the steady lighting power Ws is smaller than the predetermined value, the refresh power Wr may be set smaller.

In this embodiment, for example, the refresh power Wr may be set stepwise on the basis of the steady lighting power Ws. As an example, in a range in which the steady lighting power Ws equal to or larger than 160 W and smaller than 200 W, the refresh power Wr can be set to 200 W. In a range in which the steady lighting power Ws is equal to or larger than 140 W and smaller than 160 W, the refresh power Wr can be set to 185 W. In a range in which the steady lighting power Ws is smaller than 140 W, the refresh power Wr can be set to 170 W.

In the above explanation, as the method of adjusting the heat load applied to the first electrode 92 in the high power mode, the method of adjusting the heat load according to the value of the refresh power Wr is selected. However, the method of selecting the heat load is not limited to this. In this embodiment, for example, the heat load applied to the first electrode 92 in the high power mode may be adjusted according to a driving current waveform in the high power mode. In other words, the magnitude of the heat load applied to the first electrode 92 may be adjusted by adjusting a driving current waveform supplied to the discharge lamp 90 in the high power mode.

Specifically, for example, the control section 40 controls the discharge lamp driving section 230 such that the driving current waveform in the high power mode includes a waveform of high load driving current that can apply a high heat load to the first electrode 92. The control section 40 adjusts a ratio of the high load driving current waveform to the entire driving current waveform. Consequently, the magnitude of the heat load applied to the first electrode 92 is adjusted.

Figure 9:
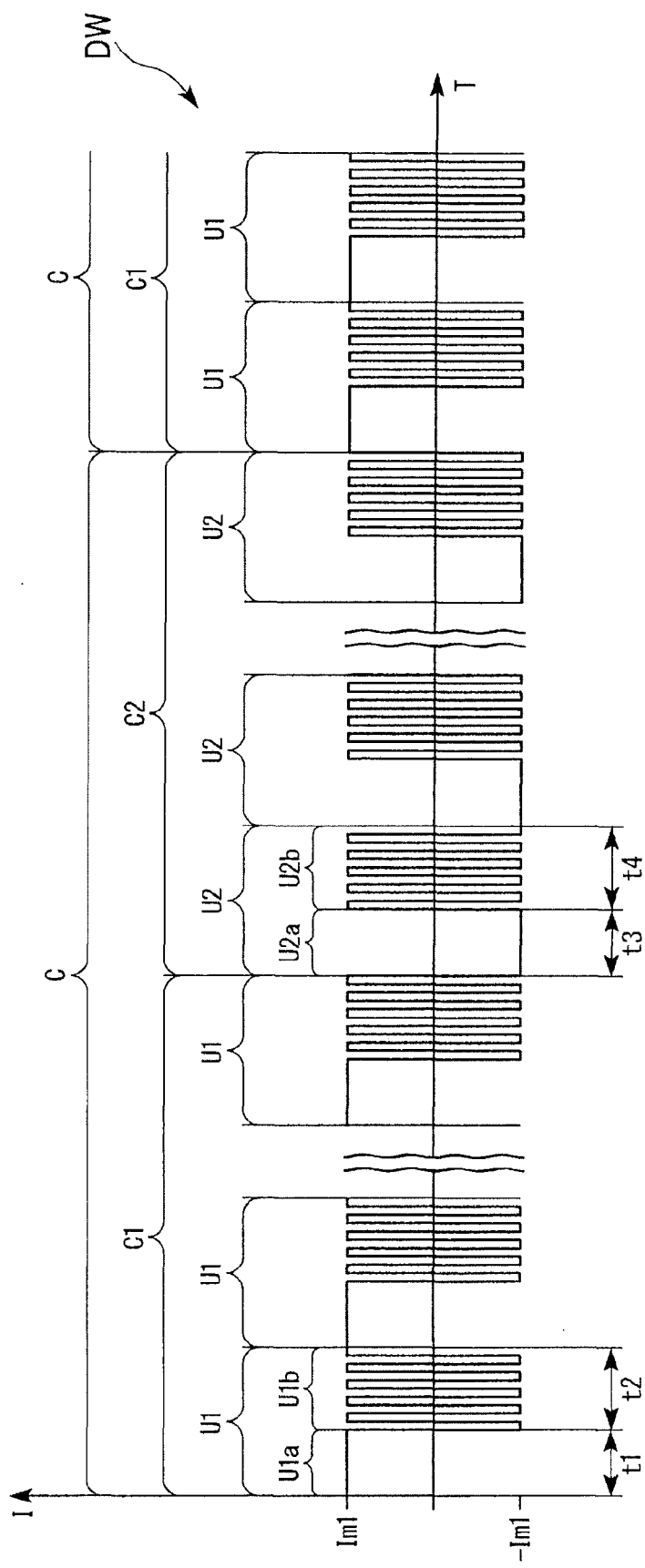
FIG. 9 is a diagram showing an example of waveform of a high load driving current in the embodiment.

FIG. 9 is an example of a high load driving current waveform (a driving current waveform) DW. In FIG. 9, the ordinate indicates the driving current I and the abscissa indicates the time T. The driving current I is shown as positive in the first polarity state and is shown as negative in the second polarity state.

As shown in FIG. 9, the high load driving current waveform DW is configured by a series of a plurality of control cycles C. The control cycle C includes a first control cycle C1 and a second control cycle C2.

The first control cycle C1 is configured by a series of a plurality of unit driving periods U1. As an example, one first control cycle C1 includes ten unit driving periods U1.

The unit driving period U1 includes a direct current period U1a and an alternating current period U1b.

The direct current period U1a is a period when a direct current having a current value Im1, that is, a direct current in the first polarity state is supplied to the discharge lamp 90 as the driving current I.

The alternating current period U1b is a period when an alternating current, the polarity of which is inverted a plurality of times between the current value Im1 and a current value −Im1, is supplied to the discharge lamp 90 as the driving current I.

The second control cycle C2 is configured by a series of a plurality of unit driving periods U2. As an example, one second control cycle C2 includes ten unit driving periods U2.

The unit driving period U2 includes a direct current period U2a and an alternating current period U2b.

The direct current period U2a is a period when a direct current having the current value −Im1, that is, a direct current in the second polarity state is supplied to the discharge lamp 90 as the driving current I.

Like the alternating current period U1b of the first control cycle C1, the alternating current period U2b is a period when an alternating current, the polarity of which is inverted a plurality of times between the current value Im1 and the current value −Im1, is supplied to the discharge lamp 90.

In the first control cycle C1, the direct current period U1a when the direct current in the first polarity state is supplied is provided. Therefore, the heat load applied to the first electrode 92 is large. On the other hand, in the second control cycle C2, the direct current period U2a when the direct current in the second polarity state is supplied is provided. Therefore, the heat load applied to the second electrode 93 is large.

Therefore, by repeatedly performing the control cycle C, it is possible to increase the heat load applied to the first electrode 92 and the second electrode 93.

As an example, lengths t1 and t3 of the direct current periods U1a and U2a are set to approximately 8 ms (milliseconds). As an example, lengths t2 and t4 of the alternating current periods U1b and U2b are set to length equivalent to five cycles at 500 Hz, that is, approximately 10 ms (milliseconds). By setting the lengths in this way, it is possible to suitably set the heat load applied to the first electrode 92 and the second electrode 93 large.

The control section 40 sets the ratio of the high load driving current waveform DW to the entire driving current waveform in the high power mode to be smaller as the steady lighting power Ws is smaller. Consequently, it is possible to set the heat load applied to the first electrode 92 in the high power mode to be smaller as the steady lighting power Ws is smaller. It is possible to suppress disappearance of the protrusion 552p.

An example of a ratio (%) of the high load driving current waveform DW set with respect to the steady lighting power Ws is shown in Table 2.

TABLE 2

| Steady lighting power Ws (W) | Ratio (%) of high load driving current waveform |
|---|---|
| 160 | 50 |
| 140 | 40 |
| 120 | 30 |

In Table 2, an example of ratios (%) of the high load driving current waveform DW respectively set when the steady lighting power Ws is 160 W, 140 W, and 120 W is shown. In Table 2, the refresh power Wr in the high power mode is set to be fixed at, for example, 170 W irrespective of the magnitude of the steady lighting power Ws.

Note that, in this configuration, the high load driving current waveform DW is not particularly limited and may be any waveform as long as the heat load applied to the first electrode 92 can be increased. The high load driving current waveform DW may be, for example, a waveform with which the driving current I having a value larger than the driving current I of the normal driving current waveform is supplied to the discharge lamp 90.

In this embodiment, the magnitude of the heat load applied to the first electrode 92 in the high power mode may be adjusted by adjusting, on the basis of the steady lighting power Ws, both of the value of the refresh power Wr and the ratio of the high load driving current waveform DW explained above.

In the above explanation, the high power mode is executed in the launching period PH1. However, the high power mode is not limited to this. In this embodiment, the high power mode may be executed in the steady lighting period PH2. That is, the control section 40 may control the discharge lamp driving section 230 to execute the high power mode during the steady lighting period PH2 in which the steady lighting mode is performed. With this configuration, the high power mode can be executed at any timing in the steady lighting period PH2. Therefore, it is possible to execute the high power mode at appropriate timing according to a deterioration degree of the protrusion 552p.

Note that, in the embodiment explained above, the example is explained in which the invention is applied to the projector of the transmission type. However, the invention can also be applied to a projector of a reflection type. The "transmission type" means that a liquid crystal light valve including a liquid crystal panel is a light transmitting type. The "reflection type" means that the liquid crystal light valve is a light reflecting type. Note that the light modulating device is not limited to the liquid crystal panel and the like and may be a light modulating device including a micro mirror.

In the embodiment explained above, the example of the projector 500 including the three liquid crystal panels 560R, 560G, and 560B (the liquid crystal light valves 330R, 330G, and 330B) is explained. However, the invention can also be applied to a projector including only one liquid crystal panel and a projector including four or more liquid crystal panels.

The entire disclosure of Japanese Patent Application No. 2014-176876, filed Sep. 1, 2014 is expressly incorporated by reference herein.

What is claimed is:
1. A discharge lamp driving device comprising:
a discharge lamp driving section configured to supply driving power to a discharge lamp including electrodes; and a control section configured to control the discharge lamp driving section, wherein the control section is configured to perform a steady lighting driving for supplying first driving power to the discharge lamp and a high power driving for supplying second driving power larger than the first driving power to the discharge lamp, and magnitude of heat load on the electrodes by the high power driving changes on the basis of the first driving power.

2. The discharge lamp driving device according to claim 1, wherein the magnitude of the heat load is set to be smaller as the first driving power is smaller.

3. The discharge lamp driving device according to claim 1, wherein the magnitude of the heat load changes on the basis of the first driving power in previous steady lighting driving.

4. The discharge lamp driving device according to claim 1, wherein the magnitude of the heat load is adjusted according to a value of the second driving power in the high power driving.

5. The discharge lamp driving device according to claim 1, wherein the magnitude of the heat load is adjusted according to a waveform of a driving current supplied to the discharge lamp in the high power driving.

6. The discharge lamp driving device according to claim 1, wherein the control section controls the discharge lamp driving section to perform the high power driving in a launching period from a start of lighting of the discharge lamp to a shift to a steady lighting period when the steady lighting driving is performed.

7. The discharge lamp driving device according to claim 1, wherein the control section controls the discharge-lamp driving section to perform the high power driving in a steady lighting period when the steady lighting driving is performed.

8. The discharge lamp driving device according to claim 1, wherein the control section performs the high power driving when the set first driving power is lower than rated power of the discharge lamp.

9. A projector comprising:
the discharge lamp configured to emit light;
the discharge lamp driving device according to claim 1;
a light modulating device configured to modulate, according to a video signal, light emitted from the discharge lamp; and
a projection optical system configured to project the light modulated by the light modulating device.

10. A projector comprising:
the discharge lamp configured to emit light;
the discharge lamp driving device according to claim 2;
a light modulating device configured to modulate, according to a video signal, light emitted from the discharge lamp; and
a projection optical system configured to project the light modulated by the light modulating device.

11. A projector comprising:
the discharge lamp configured to emit light;
the discharge lamp driving device according to claim 3;
a light modulating device configured to modulate, according to a video signal, light emitted from the discharge lamp; and
a projection optical system configured to project the light modulated by the light modulating device.

12. A projector comprising:
the discharge lamp configured to emit light;
the discharge lamp driving device according to claim 4;
a light modulating device configured to modulate, according to a video signal, light emitted from the discharge lamp; and
a projection optical system configured to project the light modulated by the light modulating device.

13. A projector comprising:
the discharge lamp configured to emit light;
the discharge lamp driving device according to claim 5;
a light modulating device configured to modulate, according to a video signal, light emitted from the discharge lamp; and
a projection optical system configured to project the light modulated by the light modulating device.

14. A projector comprising:
the discharge lamp configured to emit light;
the discharge lamp driving device according to claim 6;
a light modulating device configured to modulate, according to a video signal, light emitted from the discharge lamp; and
a projection optical system configured to project the light modulated by the light modulating device.

15. A projector comprising:
the discharge lamp configured to emit light;
the discharge lamp driving device according to claim 7;
a light modulating device configured to modulate, according to a video signal, light emitted from the discharge lamp; and
a projection optical system configured to project the light modulated by the light modulating device.

16. A projector comprising:
the discharge lamp configured to emit light;
the discharge lamp driving device according to claim 8;
a light modulating device configured to modulate, according to a video signal, light emitted from the discharge lamp; and
a projection optical system configured to project the light modulated by the light modulating device.

17. A discharge lamp driving method for supplying driving power to a discharge lamp including electrodes and driving the discharge lamp, the discharge lamp driving method comprising:
performing a steady lighting driving for supplying first driving power to the discharge lamp; and
performing a high power driving for supplying second driving power larger than the first driving power to the discharge lamp, wherein
magnitude of heat load on the electrodes by the high power driving changes on the basis of the first driving power.

* * * * *